US009930489B2

(12) United States Patent
Guo (10) Patent No.: US 9,930,489 B2
(45) Date of Patent: Mar. 27, 2018

(54) DISTANCE DISPLAY METHOD BASED ON SOCIAL NETWORKING APPLICATION, TERMINAL, AND SERVER

(71) Applicant: Tencent Technology (Shenzhen) Company Limited, Shenzhen (CN)

(72) Inventor: Xiao Guo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/432,736

(22) Filed: Feb. 14, 2017

(65) Prior Publication Data

US 2017/0164153 A1    Jun. 8, 2017

Related U.S. Application Data

(63) Continuation of application No. PCT/CN2016/074121, filed on Feb. 19, 2016.

(30) Foreign Application Priority Data

Apr. 7, 2015   (CN) .......................... 2015 1 0161458

(51) Int. Cl.
| | |
|---|---|
| *H04W 4/20* | (2009.01) |
| *H04W 4/02* | (2018.01) |
| *H04W 8/00* | (2009.01) |
| *H04L 29/08* | (2006.01) |

(52) U.S. Cl.
CPC ............. *H04W 4/023* (2013.01); *H04L 67/18* (2013.01); *H04W 4/206* (2013.01); *H04W 8/005* (2013.01)

(58) Field of Classification Search
CPC .......... H04W 4/02; H04W 4/14; H04W 4/16; H04W 4/206; H04W 4/22; H04W 8/005; H04W 4/008; H04W 4/023; H04W 4/025; H04W 4/12
See application file for complete search history.

(56) References Cited

U.S. PATENT DOCUMENTS

| | | | |
|---|---|---|---|
| 2012/0069131 A1* | 3/2012 | Abelow ............... | G06Q 10/067 348/14.01 |
| 2013/0091452 A1* | 4/2013 | Sorden .................... | G06F 3/048 715/771 |
| 2015/0188949 A1* | 7/2015 | Mahaffey ................ | H04L 63/20 726/1 |
| 2016/0007083 A1* | 1/2016 | Gurha ............. | H04N 21/44222 725/13 |
| 2016/0086108 A1* | 3/2016 | Abelow ............... | G06Q 10/067 705/7.29 |
| 2016/0182707 A1* | 6/2016 | Gabel ............... | H04M 1/72541 455/404.2 |
| 2017/0017355 A1* | 1/2017 | Lim ...................... | G06F 3/0482 |

* cited by examiner

*Primary Examiner* — Diane Mizrahi
(74) *Attorney, Agent, or Firm* — Brinks Gilson & Lione (57) ABSTRACT

A distance display method based on a social networking application includes: establishing, by a first terminal, a connection with a second terminal by using a social networking application obtaining, by the first terminal, a distance to the second terminal; and generating, by the first terminal according to the distance, an icon corresponding to the distance, and displaying the icon on an interface of the social networking application.

16 Claims, 7 Drawing Sheets

DISTANCE DISPLAY METHOD BASED ON SOCIAL NETWORKING APPLICATION, TERMINAL, AND SERVER

RELATED APPLICATION

This application is a continuation application of PCT Patent Application No. PCT/CN2016/074121, filed on Feb. 19, 2016, which claims priority to Chinese Patent Application No. 201510161458.X, filed on Apr. 7, 2015, both of which are incorporated herein by reference in their entireties.

FIELD OF THE TECHNOLOGY

The present disclosure relates to the field of computer technologies, and in particular to a distance display method based on a social networking application, a terminal, and a server.

BACKGROUND OF THE DISCLOSURE

With the development of Internet technologies, various network applications become increasingly common in the daily life of people. Users communicate and interact with each other by using various network applications. For example, friends keep in contact by using a social networking application. Meanwhile, users have increasingly high requirements on functions of network applications.

In an existing solution, when a user wants to know about a distance from the user to another party, usually, the other party directly sends location information of the other party, and the user checks a map by using the location information to determine the distance from the user to the other party. By means of this method, the user cannot know the distance from the user to the other party rapidly and intuitively.

SUMMARY

A distance display method based on a social networking application, including:
establishing, by a first terminal, a connection with a second terminal by using the social networking application
obtaining, by the first terminal, a distance between the first terminal and the second terminal; and
generating, by the first terminal, an icon corresponding to the distance according to the distance, and displaying the icon on an interface of the social networking application.

A terminal, comprising:
a memory storing a set of instructions; and
a processor in communication with the memory, wherein, when the processor executes the set of instructions, the processor is configured to:
establish a connection with a second terminal by using a social networking application;
obtain a distance to the second terminal;
generate an icon corresponding to the distance according to the distance; and
display the icon on an interface of the social networking application.

A distance display method based on a social networking application, including:
establishing a connection between a first terminal and a second terminal by using a social networking application;
obtaining first location information of the first terminal and second location information of the second terminal, and calculating a distance between the first terminal and the second terminal according to the first location information and the second location information; and
determining a presentation form of an icon according to the distance, and displaying, according to the presentation form of the icon, the icon on interfaces of the social networking application on the first terminal and the second terminal.

A server, comprising:
a memory storing a set of instructions; and
a processor in communication of the memory, wherein, when the processor executes the set of instructions, the processor is configured to:
establish a connection between a first terminal and a second terminal by using a social networking application;
obtain first location information of the first terminal and second location information of the second terminal;
calculate a distance between the first terminal and the second terminal according to the first location information and the second location information;
determine a presentation form of an icon according to the distance; and
display, according to the presentation form of the icon, the icon on interfaces of the social networking application on the first terminal and the second terminal.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Figure 1:
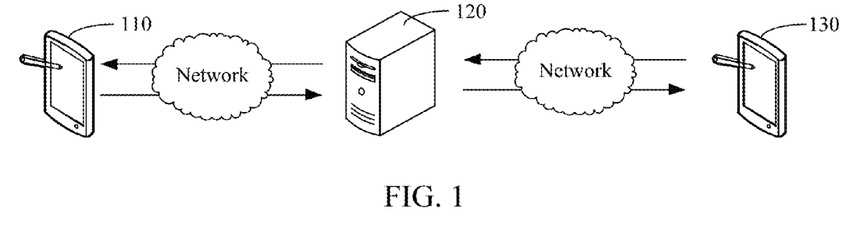
FIG. 1 is a diagram of an application environment in which a distance display method based on a social networking application is operated according to an embodiment.

FIG. 1 is a diagram of an application environment in which a distance display method based on a social networking application is operated according to an embodiment. As shown in FIG. 1, the application environment includes a terminal 110, a server 120, and a terminal 130. Both the terminal 110 and the terminal 130 may communicate with the server 120 by means of a network.

The terminal 110 and the terminal 130 may be smart phones, tablet computers, notebook computers, or desktop computers which have positioning functions, but are not limited thereto. The terminal 110 and the terminal 130 may obtain location information of the terminal 110 and the terminal 130 respectively according to built-in positioning functions. A social networking application is installed on both the terminal 110 and the terminal 130. One of the terminal 110 and the terminal 130 may request, by means of the social networking application, to establish a connection with the other terminal of the terminal 110 and the terminal 130. The server 120 may include multiple servers, and may respond to a request sent by the social networking application.

Figure 2:
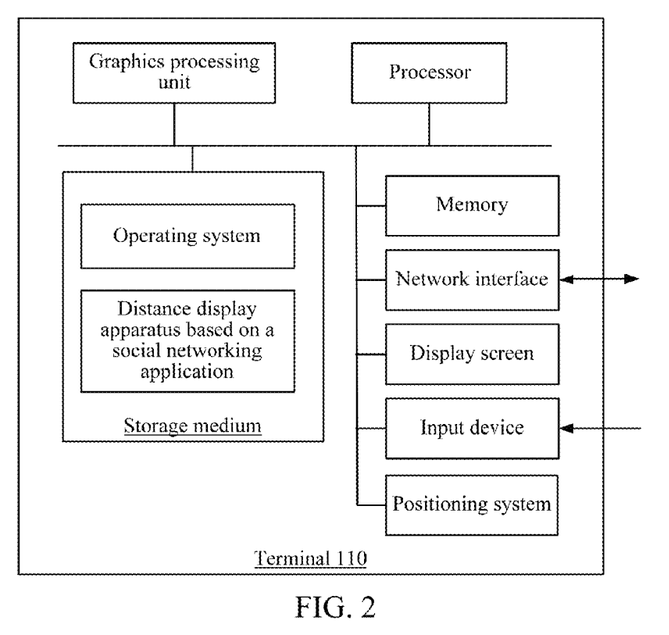
FIG. 2 is an internal structural diagram of a terminal in FIG. 1 according to an embodiment.

In an embodiment, an internal structure of the terminal 110 in FIG. 1 is as shown in FIG. 2. The terminal 110 includes a processor, a graphics processing unit, a storage medium, a memory, a network interface, a display screen, an input device, and a positioning system that are connected by using a system bus. The storage medium of the terminal 110 stores an operating system, and further includes a distance display apparatus based on a social networking application. The apparatus is configured to implement a distance display method based on a social networking application. The processor is configured to provide calculation and control capabilities to support the operation of the entire terminal 110. The graphics processing unit in the terminal 110 is configured to at least provide a rendering capability for a display interface. The memory provides an environment for operation of the distance display apparatus based on a social networking application in the storage medium. The network interface is configured to perform network communication with the server 120. For example, the network interface sends a connection request to the server 120, and receives data returned by the server 120. The display screen is configured to display an application interface. For example, the display displays an icon on the application interface. The input device is configured to receive a command or data input by a user. For the terminal 110 with a touch screen, the display screen and the input device may be the touch screen. The positioning system is configured to obtain location information of the terminal 110.

Figure 3:
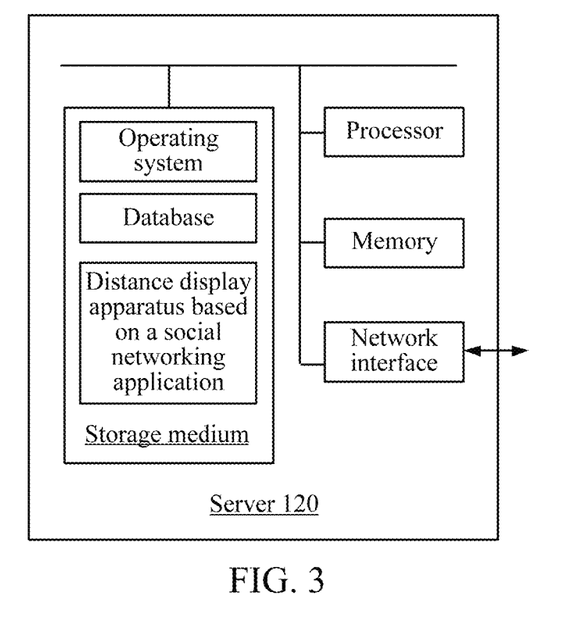
FIG. 3 is an internal structural diagram of a server in FIG. 1 according to an embodiment.

In an embodiment, an internal structure of the server 120 in FIG. 1 is as shown in FIG. 3. The server 120 includes a processor, a storage medium, a memory, and a network interface that are connected by using a system bus. The storage medium of the server 120 stores an operating system, a database, and a distance display apparatus based on a social networking application. The database is configured to store data. The apparatus is configured to implement a distance display method based on a social networking application which is applicable to the server 120. The processor of the server 120 is configured to provide calculation and control capabilities to support the operation of the entire server 120. The memory of the server 120 provides an environment for operation of the distance display apparatus based on a social networking application in the storage medium. The network interface of the server 120 is configured to communicate with the external terminals 110 and 130 by using a network connection. For example, the network interface receives requests sent by the terminals 110 and 130, and returns data to the terminals 110 and 130.

Figure 4:
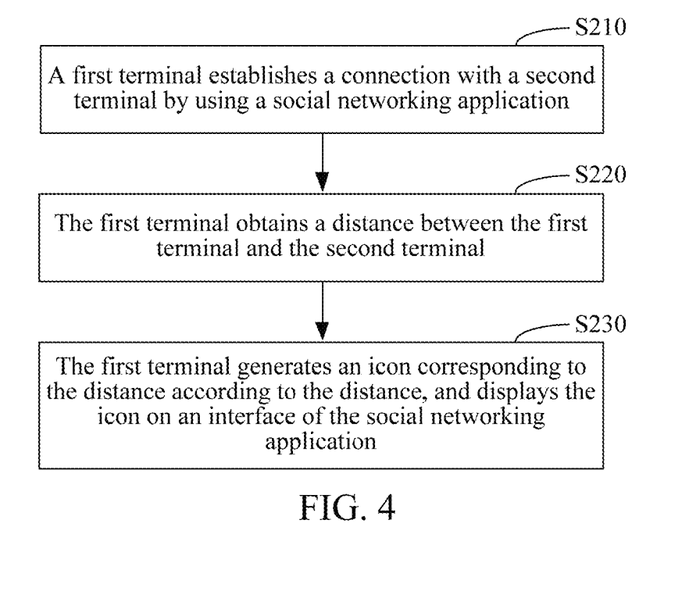
FIG. 4 is a flowchart of a distance display method based on a social networking application according to an embodiment.

As shown in FIG. 4, in an embodiment, a distance display method based on a social networking application is provided. A terminal that is applied to the foregoing application environment is used as an example for description. The method includes the following steps:

Step S210: A first terminal establishes a connection with a second terminal by using a social networking application.

Figure 5:
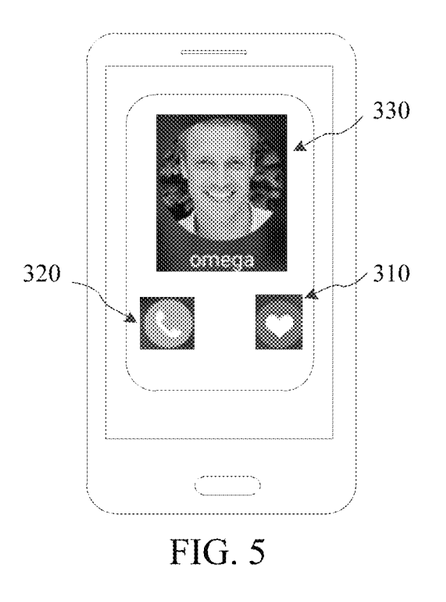
FIG. 5 is a schematic diagram of an interface of a social networking application before a connection is established according to an embodiment.
Figure 6:
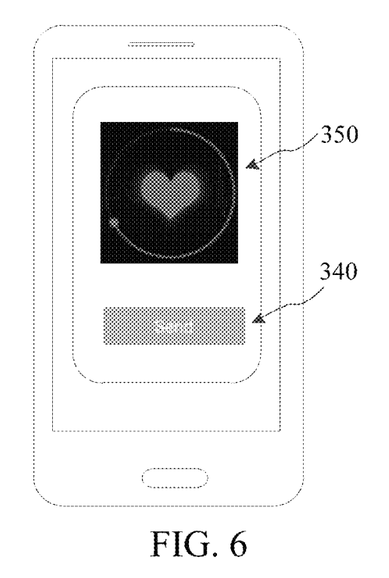
FIG. 6 is a schematic diagram of an interface of a social networking application when a connection waits to be established according to an embodiment.
Figure 7:
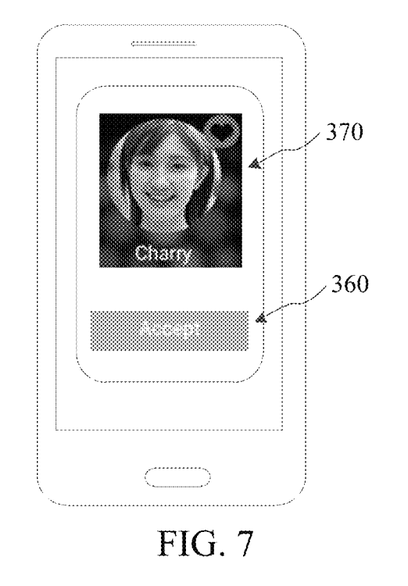
FIG. 7 is a schematic diagram of an interface of a social networking application on a receiving party of a connection request according to an embodiment.

Specifically, the social networking application is application software that provides various paths for contact or interaction to a user, and is, for example, but is not limited to, Facebook, Weibo, and instant messaging software. The social networking application is installed on the first terminal and the second terminal. The first terminal may submit a connection request by using a virtual button on the social networking application to establish a connection with the second terminal. It may be understood that before the connection is established, the social networking application is installed on both the first terminal that sends the connection request and the second terminal that receives the connection request, and a friendship relationship is established. The user first logs in to the social networking application on the first terminal to search for a friend with which the user is to establish a connection, and then sends the connection request. FIG. 5 is a schematic diagram of an interface of the social networking application on the first terminal. An icon 330 displays an avatar and a name of the friend with which a connection is to be established. An icon 320 is an instant messaging button. The connection request is sent by using an icon 310 on the interface. After the icon 310 receives an input click, the interface is shown in FIG. 6. An icon 340 indicates that the request is sent, and an icon 350 indicates that the first terminal is waiting for the other party to accept the connection request. In this case, an interface of the social networking application on the second terminal is shown in FIG. 7. An icon 360 indicates that there is a connection request waiting to be accepted. An icon 370 displays an avatar and a name of a friend that sends the connection request. After the icon 360 receives an input click, the connection request is accepted, and the connection is successfully established between the first terminal and second terminal. It may be understood that the interface of the social networking application may display an icon for rejecting a connection request, and this icon is used to reject a connection request.

Step S220: The first terminal obtains a distance between the first terminal and the second terminal.

Specifically, a mobile communications system may obtain geographical location information of a mobile terminal by using a particular positioning technology. Positioning methods include a network-based (Evolved Serving Mobile Location Center (E-SMLC)-based) positioning method and a UE-based positioning method. The network-based positioning method refers to that a location of the UE is calculated at an E-SMLC. The UE-based positioning method refers to that a location of the UE is calculated in the UE. The first terminal and the second terminal obtain respective location information of the first terminal and the second terminal by using a poisoning function, for example, a Global Positioning System (GPS) or an LTE positioning service system. After obtaining the respective location information of the first terminal and the second terminal, the first terminal and the second terminal may send the respective location information of the first terminal and the second terminal to each other, so that the first terminal or the second terminal calculates a distance between the first terminal and the second terminal according to the location information. The first terminal and the second terminal may also send the respective location information to a third terminal or the server to calculate the distance between the first terminal and the second terminal. If the second terminal, the third terminal, or the server calculates the distance between the first terminal and the second terminal, the first terminal obtains the distance in a manner of sending a request.

Step S230: The first terminal generates an icon corresponding to the distance according to the distance, and displays the icon on an interface of the social networking application.

Figure 8:
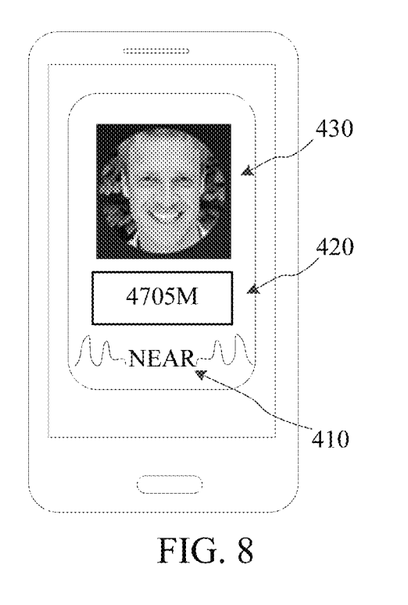
FIG. 8 is a schematic diagram of an interface of a social networking application after a connection is established according to an embodiment.

Specifically, a correspondence between the distance and the icon is obtained. The correspondence may be customized according to requirements, and different distances may correspond to icons in different presentation forms. The presentation forms include a static form and a dynamic form, where the static form includes a size, a color, and a pattern of an icon, and the dynamic form includes an animation speed of an icon, for example, a speed of flashing being quick or slow, and an animation motion, for example, fly in or fade. The icon corresponding to the distance is generated according to the correspondence, and is displayed on the interface of the social networking application. The distance may keep changing according to locations of the terminals, and therefore, the generated icon may also keep changing to form a dynamically changing icon, so that the distance between the terminals is displayed rapidly and intuitively. FIG. 8 shows an interface of the social networking application that displays icons. An icon 410 is a font icon, and a size of the icon 410 changes in real time according to the distance between the terminals, and a flashing speed of the icon 410 also changes in real time according to the distance between the terminals. An icon 420 displays an actual distance between the terminals. An icon 430 displays an avatar of a friend. A font icon may be displayed on interfaces on the first terminal and the second terminal. It may be understood that when a preset condition is reached, the icon 410 may change from a font icon to an icon in a form of another pattern, and may also change from being flashing dynamically to being static.

In this embodiment, a first terminal establishes a connection to a second terminal by using a social networking application. The first terminal obtains a distance to the second terminal; generates a corresponding icon according to the distance, where the icon directly corresponds to the distance, and the distance changes with the locations of the terminals, and therefore, the generated icon also keeps changing, and displays the icon on an interface of the social networking application, so that the distance between the terminals is displayed rapidly and intuitively by using the icon.

Figure 9:
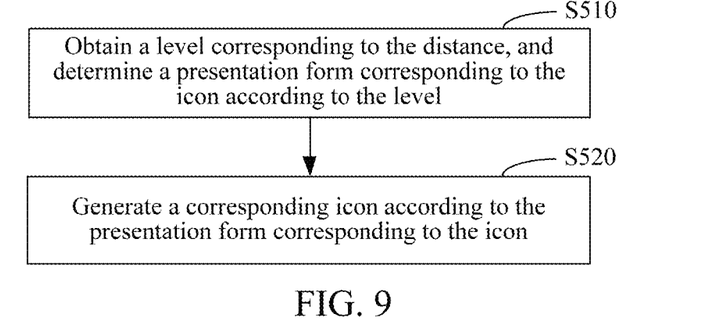
FIG. 9 is a flowchart of generating an icon according to an embodiment.

In an embodiment, as shown in FIG. 9, the step of generating, by the first terminal, an icon corresponding to the distance according to the distance includes:

Step S510: Obtain a level corresponding to the distance, and determine a presentation form of the icon according to the level.

Specifically, distances may be grouped into different levels, for example, a far level, a middle level, and a near level, where the three levels correspond to different distances. Different levels correspond to different presentation forms of an icon. After a distance is obtained, a level of the distance is found, and a presentation form of the icon is then determined according to a correspondence between a level and a presentation form of the icon. Distances are grouped into different levels, and distances within a distance range fall in a same level. In this way, it is not necessary to obtain a corresponding presentation form of the icon for each distance, and a presentation form of the icon can be rapidly obtained as long as a level is obtained.

Step S520: Generate a corresponding icon according to the presentation form corresponding to the icon.

Specifically, after the presentation form of the icon is obtained, according to parameters of the icon that are described in the presentation form, for example, a size parameter of the icon, an animation parameter of the icon, and a pattern parameter of the icon, an icon corresponding to the parameters is generated.

In an embodiment, the icon is a heartbeat icon, and a size of the heartbeat icon has an inversely proportional relationship with a value of the distance.

Figure 10:
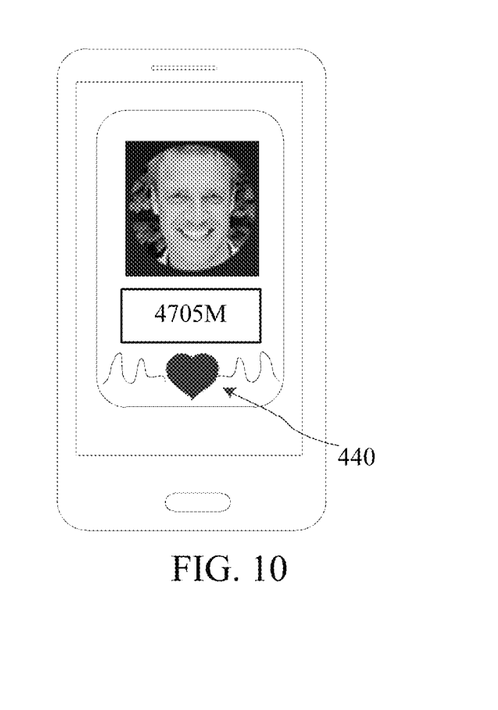
FIG. 10 is a schematic diagram of an interface of a social networking application after a connection is established according to another embodiment.

Specifically, the heartbeat icon becomes smaller when the distance between the terminals increases, and the heartbeat icon becomes larger when the distance between the terminals decreases. As the heartbeat icon becomes larger, it indicates that the other party is getting nearer. FIG. 10 shows an interface of the social networking application that displays the heartbeat icon. An icon 440 is a heartbeat icon, and a size of the icon 440 changes in real time according to the distance between the terminals. The heartbeat icon may be displayed on interfaces on both the first terminal and the second terminal, so that both parties experience the feeling of heart beating.

Figure 11:
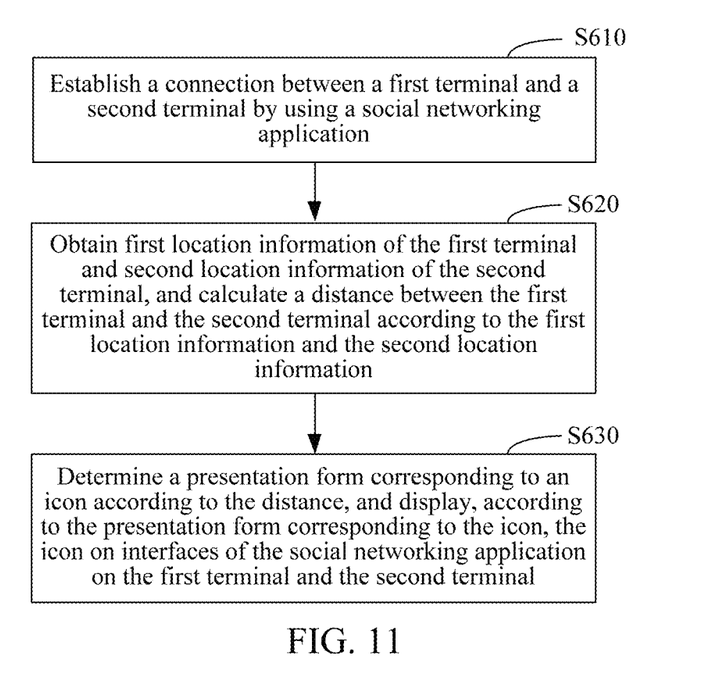
FIG. 11 is a flowchart of a distance display method based on a social networking application according to an embodiment.

In an embodiment, as shown in FIG. 11, a distance display method based on a social networking application is provided. A server that is applied to the foregoing application environment is used as an example for description. The method includes the following steps:

Step S610: Establish a connection between a first terminal and a second terminal by using a social networking application.

Specifically, the server may provide a service by interacting with a social networking application installed in a terminal. The first terminal sends a connection request to the server by using the social networking application, where the connection request includes information, for example, a user name, of a receiving party of the connection request. The server determines, according to the connection request, the second terminal at which the receiving party of the connection request is located, and establishes a connection between the first terminal and the second terminal. It may be understood that before the connection is established, the first terminal and the second terminal log in to the social networking application by using user names and a friendship is established. During login, respective terminal information is submitted. The server binds client information such as a user name to corresponding terminal information, so that a terminal at which the user name is located can be determined according to the user name.

Step S620: Obtain first location information of the first terminal and second location information of the second terminal, and calculate a distance between the first terminal and the second terminal according to the first location information and the second location information.

Specifically, the first terminal and the second terminal respectively obtain the first location information of the first terminal and the second location information of the second terminal by using a poisoning function such as a GPS positioning system, and send the respective location information to the server. The server calculates the distance between the first terminal and the second terminal according to the first location information and the second location information.

Step S630: Determine a presentation form of an icon according to the distance, and display, according to the presentation form corresponding to the icon, the icon on interfaces of the social networking application on the first terminal and the second terminal.

Specifically, a correspondence between the distance and the presentation form of the icon is obtained. The correspondence may be customized according to requirements, and different distances correspond to different presentation forms. The presentation forms include a static form and a dynamic form, where the static form includes a size, a color, and a pattern of an icon, and the dynamic form includes an animation speed of an icon, for example, a speed of flashing being quick or slow, and an animation motion, for example, fly in or fade. The presentation form of the icon corresponding to the distance is determined according to the correspondence, and the presentation form is sent to the first terminal and the second terminal. After receiving the presentation form, the first terminal and the second terminal generate, according to parameters of the icon that are described in the presentation form, for example, a size parameter of the icon, an animation parameter of the icon, and a pattern parameter of the icon, an icon corresponding to the parameters; and display the icon on respective interfaces of the social networking application. The distance may keep changing according to locations of the terminals, and therefore, the generated icon may also keep changing to form a dynamically changing icon, so that the distance between the terminals is displayed rapidly and intuitively.

In this embodiment, a connection between a first terminal and a second terminal is established by using a social networking application; first location information of the first terminal and second location information of the second terminal are obtained; a distance between the first terminal and the second terminal is calculated according to the first location information and the second location information; and a presentation form of an icon is determined according to the distance, where the presentation form of the icon directly corresponds to the distance, and the distance changes with the locations of the terminals, and therefore, the presentation form of the icon also keeps changing, so that the icon displayed, according to the presentation form, on the interfaces of the social networking application on the first terminal and the second terminal also keeps changing, so that the distance between the terminals is displayed rapidly and intuitively.

In an embodiment, the step of determining a presentation form of an icon according to the distance includes: obtaining a level corresponding to the distance; and determining the presentation form corresponding to the icon according to the level.

Specifically, distances may be grouped into different levels, for example, a far level, a middle level, and a near level, where the three levels correspond to different distances. Different levels correspond to different presentation forms of an icon. After a distance is obtained, a level of the distance is found, and a presentation form of the icon is then determined according to a correspondence between a level and a presentation form of the icon. Distances are grouped into different levels, and distances within a distance range fall in a same level. In this way, it is not necessary to obtain a corresponding presentation form of the icon for each distance, and a presentation form of the icon can be rapidly obtained as long as a level is obtained.

In an embodiment, the icon is a heartbeat icon, and a display size of the heartbeat icon has an inversely proportional relationship with a value of the distance.

Specifically, a display size of the heartbeat icon becomes smaller when the distance between the terminals increases, and the display size of the heartbeat icon becomes larger when the distance between the terminals decreases. When the display size of the heartbeat icon becomes larger, it indicates that the other party gets nearer. The heartbeat icon may be displayed on interfaces on both the first terminal and the second terminal, so that both parties experience the feeling of heart beating.

Figure 12:
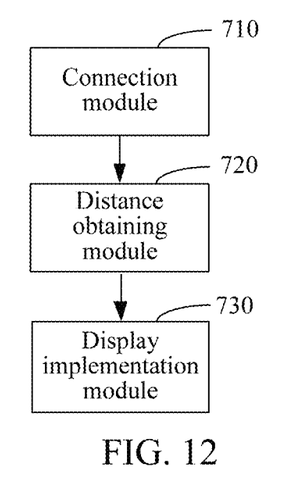
FIG. 12 is a structural block diagram of a terminal according to an embodiment.

In an embodiment, a terminal is provided. An internal structure of the terminal may correspond to the structure shown in FIG. 2. All or some of the following modules may be implemented by using software, hardware, or a combination thereof. The terminal includes: a connection module 710, configured to establish, by a first terminal, a connection with a second terminal by using a social networking application;

a distance obtaining module 720, configured to obtain, by the first terminal, a distance between the first terminal and the second terminal; and a display implementation module 730, configured to generate, by the first terminal, an icon corresponding to the distance according to the distance, and display the icon on an interface of the social networking application.

Figure 13:
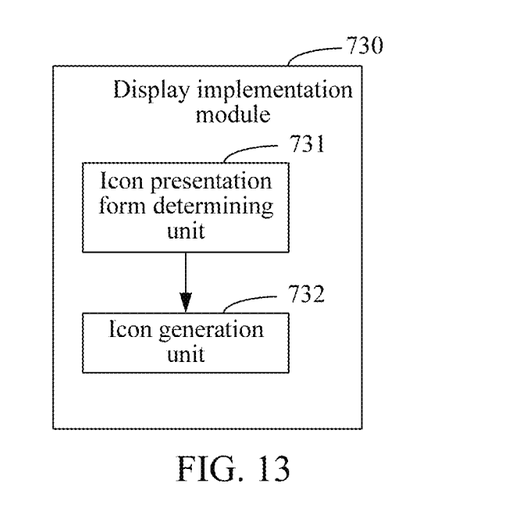
FIG. 13 is a structural block diagram of a display implementation module according to an embodiment.

In an embodiment, as shown in FIG. 13, the display implementation module 730 includes:

an icon presentation form determining unit 731, configured to obtain a level corresponding to the distance, and determine a presentation form of the icon according to the level; and an icon generation unit 732, configured to generate a corresponding icon according to the presentation form corresponding to the icon.

In an embodiment, the icon is a heartbeat icon, and a size of the heartbeat icon has an inversely proportional relationship with a value of the distance.

Figure 14:
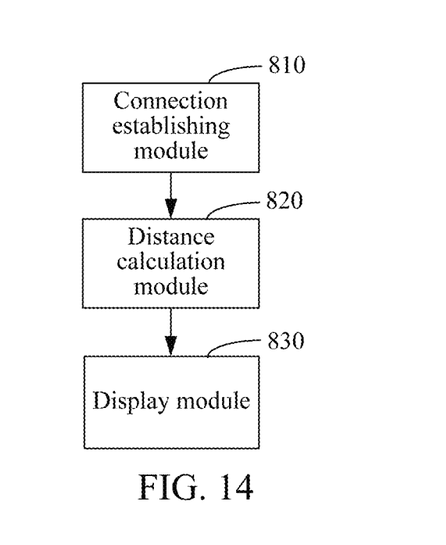
FIG. 14 is a structural block diagram of a server according to an embodiment.

In an embodiment, a server is provided. An internal structure of the server may correspond to the structure shown in FIG. 3. All or some of the following modules may be implemented by using software, hardware, or a combination thereof, as shown in FIG. 14. The server includes:

a connection establishing module 810, configured to establish a connection between a first terminal and a second terminal by using a social networking application;

a distance calculation module 820, configured to obtain first location information of the first terminal and second location information of the second terminal, and calculate a distance between the first terminal and the second terminal according to the first location information and the second location information; and a display module 830, configured to determine a presentation form of an icon according to the distance, and display, according to the presentation form corresponding to the icon, the icon on interfaces of the social networking application on the first terminal and the second terminal.

In an embodiment, the display module 830 is further configured to obtain a level corresponding to the distance, and determine the presentation form corresponding to the icon according to the level.

In an embodiment, the icon is a heartbeat icon, and a display size of the heartbeat icon has an inversely proportional relationship with a value of the distance.

A person of ordinary skill in the art may understand that all or some of the processes of the foregoing embodiments may be implemented by a computer program instructing relevant hardware. The program may be stored in a computer readable storage medium. For example, in embodiments of the present invention, the program may be stored in a storage medium of a computer system, and may be executed by at least one processor of the computer system, so as to implement the processes of the embodiments including the foregoing methods. The storage medium may be a magnetic disk, an optical disk, a read-only memory (ROM), or a random access memory (RAM).

Technical features of the foregoing embodiments may be combined randomly. To describe briefly, description is not made to all possible combinations of the technical features of the foregoing embodiments. However, as long as no conflict occurs in the combinations of these technical features, these technical features should be considered to fall within the scope recorded in this specification.

The foregoing embodiments only describe several implementation manners of the present disclosure, and the description of the implementation manners is specific and detailed, but cannot therefore be understood as a limitation to the scope of the patent of the present disclosure. It should be noted that a person of ordinary skill in the art may further make several variations and improvements without departing from the concept of the present disclosure, and these variations and improvements all fall within the protection scope of the present disclosure. Therefore, the protection scope of the patent of the present disclosure should be defined by the appended claims.

What is claimed is:

1. A distance display method based on a social networking application, comprising:
   establishing, by a first terminal, a connection with a second terminal by using the social networking application;
   obtaining, by the first terminal, a distance between the first terminal and the second terminal;
   generating, by the first terminal, a distance-corresponding icon, where:
      the distance-corresponding icon is generated according to the distance between the first terminal and the second terminal, and
      a size of the distance-corresponding icon is configured to change in real time according to a value of the distance between the first terminal and the second terminal; and
   displaying, by the first terminal, the distance-corresponding icon on an interface of the social networking application.

2. The method according to claim 1, wherein the generating, by the first terminal, the distance-corresponding icon, where the distance-corresponding icon is generated according to the distance comprises:
   obtaining, by the first terminal, a level corresponding to the distance;
   determining, by the first terminal, a presentation form of the distance-corresponding icon according to the level; and
   generating, by the first terminal, the distance-corresponding icon according to the presentation form.

3. The method according to claim 1, wherein:
   the distance-corresponding icon is a heartbeat icon, and
   a size of the heartbeat icon has an inversely proportional relationship with the value of the distance.

4. The method according to claim 2, wherein the presentation form of the distance-corresponding icon comprises at least one of:
   a static form including at least one of a size, a color, or a pattern of the distance-corresponding icon; or
   a dynamic form including at least one of an animation speed or an animation motion of the distance-corresponding icon.

5. A distance display method based on a social networking application, comprising:
   establishing, by a server comprising a memory and a processor in communication with the memory, a connection between a first terminal and a second terminal by using the social networking application;
   obtaining, by the server, first location information of the first terminal and second location information of the second terminal;
   calculating, by the server, a distance between the first terminal and the second terminal according to the first location information and the second location information;
   generating, by the server, a distance-corresponding icon, where:
      the distance-corresponding icon is generated according to the distance between the first terminal and the second terminal, and
      a size of the distance-corresponding icon is configured to change in real time according to a value of the distance between the first terminal and the second terminal; and
   displaying, by the server, the distance-corresponding icon on interfaces of the social networking application on the first terminal and the second terminal.

6. The method according to claim 5, wherein the generating, by the server, the distance-corresponding icon, where the distance-corresponding icon is generated according to the distance comprises:
   obtaining, by the server, a level corresponding to the distance;
   determining, by the server, a presentation form of the distance-corresponding icon according to the level; and
   generating, by the server, the distance-corresponding icon according to the presentation form.

7. The method according to claim 5, wherein:
   the distance-corresponding icon is a heartbeat icon, and
   a display size of the heartbeat icon has an inversely proportional relationship with the value of the distance.

8. The method according to claim 6 wherein the presentation form of the distance-corresponding icon comprises at least one of:
   a static form including at least one of a size, a color, or a pattern of the distance-corresponding icon; or
   a dynamic form including at least one of an animation speed or an animation motion of the distance-corresponding icon.

9. A terminal, comprising:
   a memory storing a set of instructions; and
   a processor in communication with the memory, wherein, when the processor executes the set of instructions, the processor is configured to:

establish a connection with a second terminal by using a social networking application;
obtain a distance to the second terminal;
generate an distance-corresponding icon, where:
the distance-corresponding icon is generated according to the distance between the terminal and the second terminal, and
a size of the distance-corresponding icon is configured to change in real time according to a value of the distance between the terminal and the second terminal; and
display the distance-corresponding icon on an interface of the social networking application.

10. The terminal according to claim 9, wherein, when the processor is configured to generate the distance-corresponding icon, the processor is configured to:
obtain a level corresponding to the distance;
determine a presentation form of the distance-corresponding icon according to the level; and
generate the distance-corresponding icon according to the presentation form.

11. The terminal according to claim 9, wherein:
the distance-corresponding icon is a heartbeat icon, and
a size of the heartbeat icon has an inversely proportional relationship with the value of the distance.

12. The terminal according to claim 10, wherein the presentation form of the distance-corresponding icon comprises at least one of:
a static form including at least one of a size, a color, or a pattern of the distance-corresponding icon; or
a dynamic form including at least one of an animation speed or an animation motion of the distance-corresponding icon.

13. A server, comprising:
a memory storing a set of instructions; and
a processor in communication of the memory, wherein, when the processor executes the set of instructions, the processor is configured to:
establish a connection between a first terminal and a second terminal by using a social networking application;
obtain first location information of the first terminal and second location information of the second terminal;
calculate a distance between the first terminal and the second terminal according to the first location information and the second location information;
generating a distance-corresponding icon, where:
the distance-corresponding icon is generated according to the distance between the first terminal and the second terminal, and
a size of the distance-corresponding icon is configured to change in real time according to a value of the distance between the first terminal and the second terminal; and
display, the distance-corresponding icon on interfaces of the social networking application on the first terminal and the second terminal.

14. The server according to claim 13, wherein, when the processor is configured to generate the distance-corresponding icon, the processor is configured to:
obtain a level corresponding to the distance;
determine a presentation form of the distance-corresponding icon according to the level; and
generate the distance-corresponding icon according to the presentation form.

15. The server according to claim 13, wherein:
the distance-corresponding icon is a heartbeat icon, and
a display size of the heartbeat icon has an inversely proportional relationship with the value of the distance.

16. The server according to claim 14, wherein the presentation form of the distance-corresponding icon comprises at least one of:
a static form including at least one of a size, a color, or a pattern of the distance-corresponding icon; or
a dynamic form including at least one of an animation speed or an animation motion of the distance-corresponding icon.

* * * * *